(12) United States Patent
Lin

(10) Patent No.: US 7,984,886 B2
(45) Date of Patent: Jul. 26, 2011

(54) CARRYING APPARATUS FOR AUTOMOBILE PORTABLE ELECTRONIC DEVICE

(76) Inventor: Rocky Yi-Ping Lin, Taipei (TW)

( * ) Notice: Subject to any disclaimer, the term of this patent is extended or adjusted under 35 U.S.C. 154(b) by 319 days.

(21) Appl. No.: 12/332,500

(22) Filed: Dec. 11, 2008

(65) Prior Publication Data

US 2010/0148030 A1    Jun. 17, 2010

(51) Int. Cl.
*F16M 11/02*    (2006.01)
(52) U.S. Cl. ............... 248/181.1; 248/160; 248/288.31; 248/918; 108/44
(58) Field of Classification Search ............ 248/663, 248/181.1, 288.31, 288.51, 918, 160, 346.06; 224/553, 282, 42.38, 548, 557, 929; 108/44, 108/45, 138, 145, 150
See application file for complete search history.

(56) References Cited

U.S. PATENT DOCUMENTS

| | | | | |
|---|---|---|---|---|
| 5,564,668 A * | 10/1996 | Crowe, II | ............ | 248/284.1 |
| 5,673,628 A * | 10/1997 | Boos | ............ | 108/44 |
| 6,220,556 B1 * | 4/2001 | Sohrt et al. | ............ | 248/279.1 |
| 6,386,413 B1 * | 5/2002 | Twyford | ............ | 224/553 |
| 7,090,181 B2 * | 8/2006 | Biba et al. | ............ | 248/288.31 |
| 2007/0034753 A1 * | 2/2007 | Lee | ............ | 248/121 |

FOREIGN PATENT DOCUMENTS

TW    M293382    7/2006

* cited by examiner

*Primary Examiner* — Gwendolyn Baxter
(74) *Attorney, Agent, or Firm* — Chun-Ming Shih; HDLS IPR Services

(57) ABSTRACT

A carrying apparatus of an automobile portable electronic device includes a carrying module, a support rod, a quick release mechanism and a universal joint. The carrying module includes a tray, and the support rod is installed under the tray. The quick release mechanism is installed between the tray and the support rod. The quick release mechanism includes a clamping module and a binder turning rod, and the clamping module is connected to the support rod, and the binder turning rod is passed and disposed at the clamping module. An end of the universal joint is connected to the tray, and another end of the universal joint is covered and clamped by the clamping module, and the tray can be turned and deviated in two-dimensional directions with respect to the support rod.

10 Claims, 13 Drawing Sheets

CARRYING APPARATUS FOR AUTOMOBILE PORTABLE ELECTRONIC DEVICE

BACKGROUND OF THE INVENTION

1. Field of the Invention

The present invention generally relates to a carrying apparatus, and more particularly to a carrying apparatus of an automobile portable electronic device.

2. Description of Prior Art

In the era emphasizing on speed and controlling time, many people usually use an electronic device such as a computer in a car for the business purpose, and thus an automobile electronic instrument stand was introduced.

In a traditional automobile electronic instrument stand as disclosed in R.O.C. Pat. No. M293382 entitled "Automobile portable electronic device carrying apparatus", a carrying apparatus is provided for fixing an electronic device (such as a notebook computer) on the carrying apparatus in a car, and a bendable rod structure is used for providing users to adjust the support height and angle according to a user's requirement to meet the most appropriate condition of the operation.

However, the aforementioned carrying structure still has the following drawbacks. Since a support frame can be rotated with respect to the axial center of a long rod, the angle of elevation of the support frame with respect to the long rod cannot be adjusted, and thus the angle of the support frame cannot be adjusted freely. In a practical operation, it is necessary to adjust the height of the support frame to be equal to the height of the long rod, and the position of the support frame with respect to the long rod in the car when the angle of the support frame is adjusted. However, the space in the car is very limited, and thus such carrying structure still has the aforementioned drawbacks.

In view of the foregoing shortcomings of the prior art, the inventor of the present invention based on years of experience in the related industry to conduct extensive researches and experiments, and finally developed a carrying apparatus of an automobile portable electronic device to overcome the shortcomings of the prior art.

SUMMARY OF THE INVENTION

It is a primary objective of the present invention to provide a carrying apparatus of an automobile portable electronic device, wherein a universal joint is covered and clamped by a clamping module, so that a tray can be turned and deviated in two-dimensional directions with respect to a support rod to enhance the freedom of adjusting the angle of the carrying apparatus.

Another objective of the present invention is to provide a carrying apparatus of an automobile portable electronic device, wherein a quick release mechanism is forcibly pressed, such that the universal joint can be clamped to or released from the clamping module to reduce the time of positioning the tray with respect to the support rod.

To achieve the foregoing objectives, the present invention provides a carrying apparatus of an automobile portable electronic device comprising a carrying module, a support rod, a quick release mechanism and a universal joint, wherein the carrying module includes a tray, and the support rod is installed under the tray, and the quick release mechanism is installed between the tray and the support rod, and the quick release mechanism includes a clamping module and a binder turning rod, and the clamping module is connected to the support rod, and the binder turning rod is passed and disposed at the clamping module, and an end of the universal joint is connected to the tray, and another end of the universal joint is covered and clamped by the clamping module, and the tray can be turned and deviated in two-dimensional directions with respect to the support rod.

DETAILED DESCRIPTION OF THE INVENTION

The technical characteristics, features and advantages of the present invention will become apparent in the following detailed description of preferred embodiments with reference to the accompanying drawings, and the preferred embodiments are used for illustrating the present invention only, but not intended to limit the scope of the invention.

Figure 1:
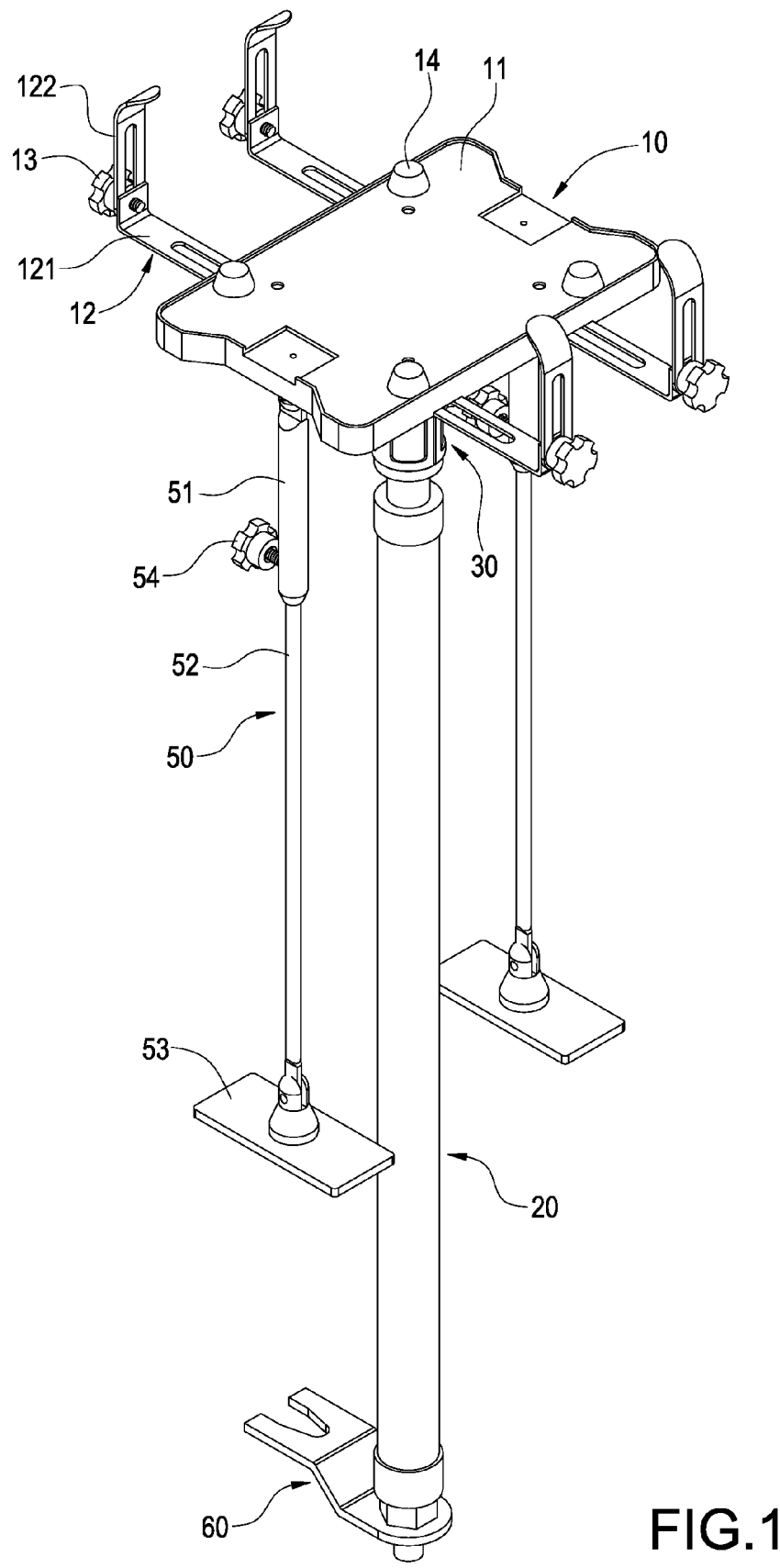
FIG. 1 is a perspective view of the present invention.
Figure 2:
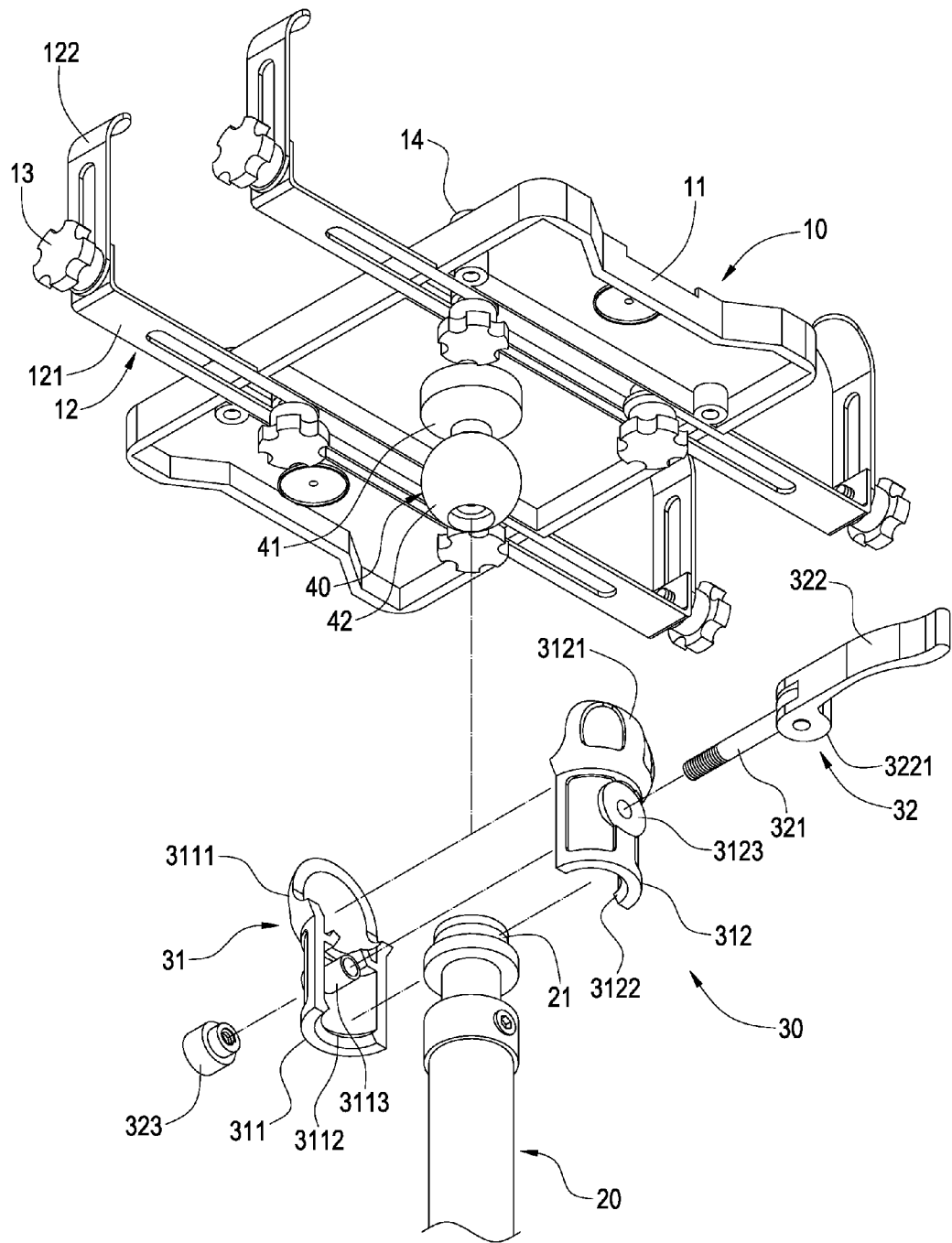
FIG. 2 is an exploded view of the present invention.

With reference to FIGS. 1 and 2 for a perspective view and an exploded view of the present invention, the invention provides a carrying apparatus of an automobile portable electronic device comprising a carrying module 10, a support rod 20, a quick release mechanism 30 and a universal joint 40.

The carrying module 10 is used for carrying an electronic device such as a notebook computer, and the carrying module 10 comprises a tray 11 and a plurality of positioning frames 12, wherein the positioning frames 12 are coupled to the bottom side of the tray 11 and secured by a plurality of binding screws 13, and the positioning frame 12 comprises a support plate 121 and a binding plate 122 is coupled separately to both ends of the support plate 121, and the support plate 121 and the binding plate 122 are substantially U-shaped, and the binding plate 122 is fixed to the support plate 121 by a binding screw 13, and the tightness of the binding plate 122 can be adjusted, and the carrying module 10 further comprises a plurality of shock absorbers 14 disposed on a surface of the tray 11.

The support rod 20 is installed at the bottom of the tray 11, and a slot 21 is formed at the external periphery of an end of the support rod 20 and proximate to the tray 11, and another end of the support rod 20 is fixed to a slide base (not shown in the figure) of a seat in a car.

The quick release mechanism 30 is installed between the tray 11 and the support rod 20, and the quick release mechanism 30 comprises a clamping module 31 and a binder turning rod 32, and the bottom of the clamping module 31 is coupled to the support rod 20. The clamping module 31 comprises a first clamp 311 and a second clamp 312, and the first clamp 311 and the second clamp 312 include a ball socket 3111 and a ball socket 3121 respectively, and a universal joint 40 is covered and held by the ball socket 3111 and the ball socket 3121.

The first clamp 311 and the second clamp 312 further comprise a bump 3112 and a bump 3122 disposed at the bottom of the first clamp 311 and the bottom of the second clamp 312 respectively, and a slot 21 formed separately at the external periphery of an end of the support rod 20 for embedding the bump 3112 and the bump 3122.

The first clamp 311 and second clamp 312 have a cylindrical pillar 3113 and a cylindrical pillar 3123 connected to the ball socket 3111 and the bottom of the ball socket 3121, and the cylindrical pillar 3113 and the cylindrical pillar 3123 are passed with the binder turning rod 32 and forcibly bound.

The binder turning rod 32 comprises a screw pillar 321, a turning rod 322 pivotally coupled to an end of the screw pillar 321, and a nut 323, and the screw pillar 321 is passed through the cylindrical pillar 3113 and the cylindrical pillar 3123, and the nut 323 is secured to another end of the screw pillar 321, and the turning rod 322 includes a binding arc pillar 3221, such that when the turning rod 322 is turned to abut the external surfaces of the binding arc pillar 3221 and the cylindrical pillar 3123, the first clamp 311 and the second clamp 312.

The universal joint 40 comprises a connecting end 41 and a spherical ball coupled to the connecting end 41, and the connecting end 41 is connected to tray 11, and the spherical ball 42 is covered and clamped by the clamping module 31, such that the tray 11 can be turned and deviated in two-dimensional directions with respect to the support rod 20.

The carrying apparatus further comprises a plurality of support modules 50 disposed on both sides of the bottom of the tray 11, and a positioning plate 60 coupled to the bottom of the support rod 20, and the support module 50 is used for providing a support function to reduce the burden of the support rod 20. The support module 50 comprises a bushing 51 connected to the bottom side of the tray 11, a contractible rod 52 passed into the bushing 51 and contracted or extended with respect to the bushing 51, a plate 53 coupled to the bottom of the contractible rod 52, and a binding screw 54 secured onto a lateral side of the bushing 51.

Figure 3:
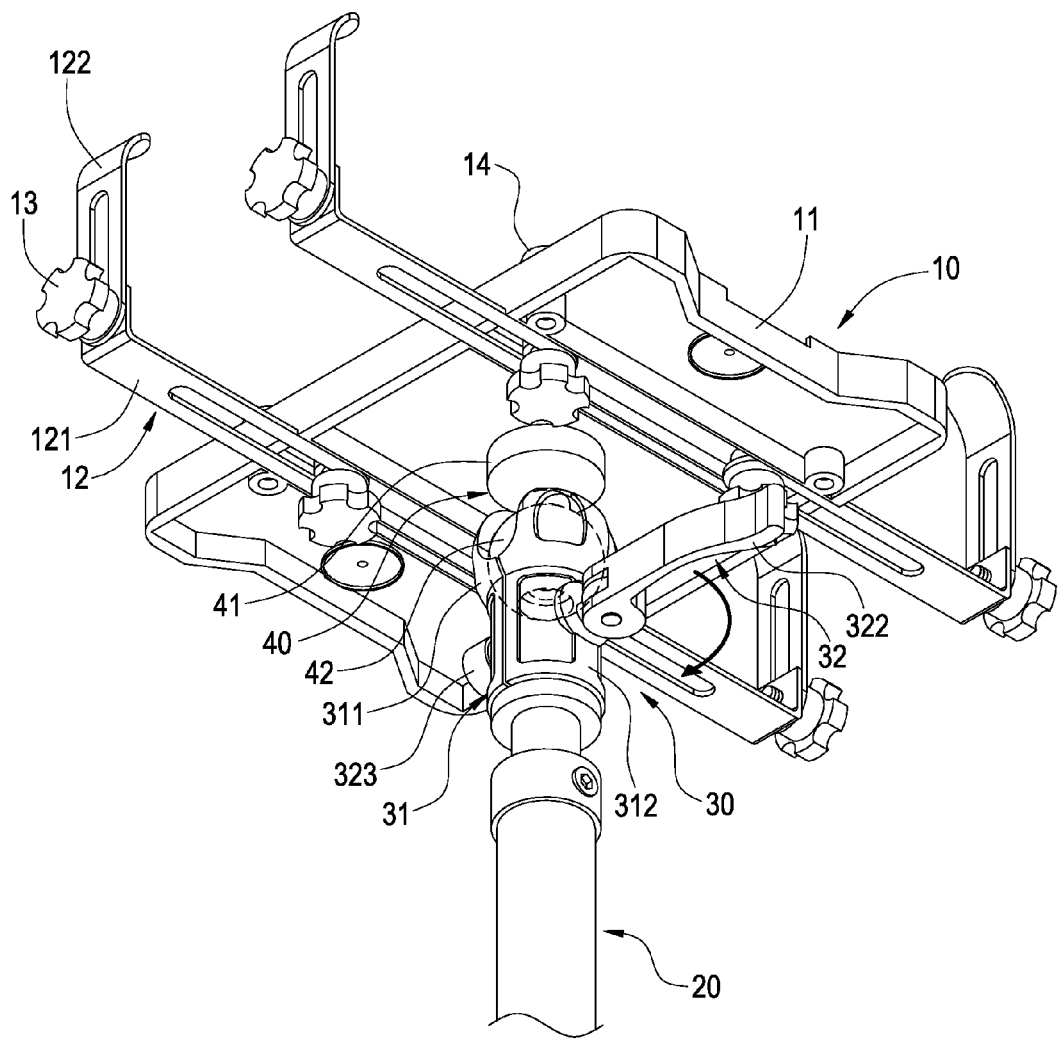
FIG. 3 is a perspective view of an operation of the present invention viewed at another viewing angle.
Figure 4:
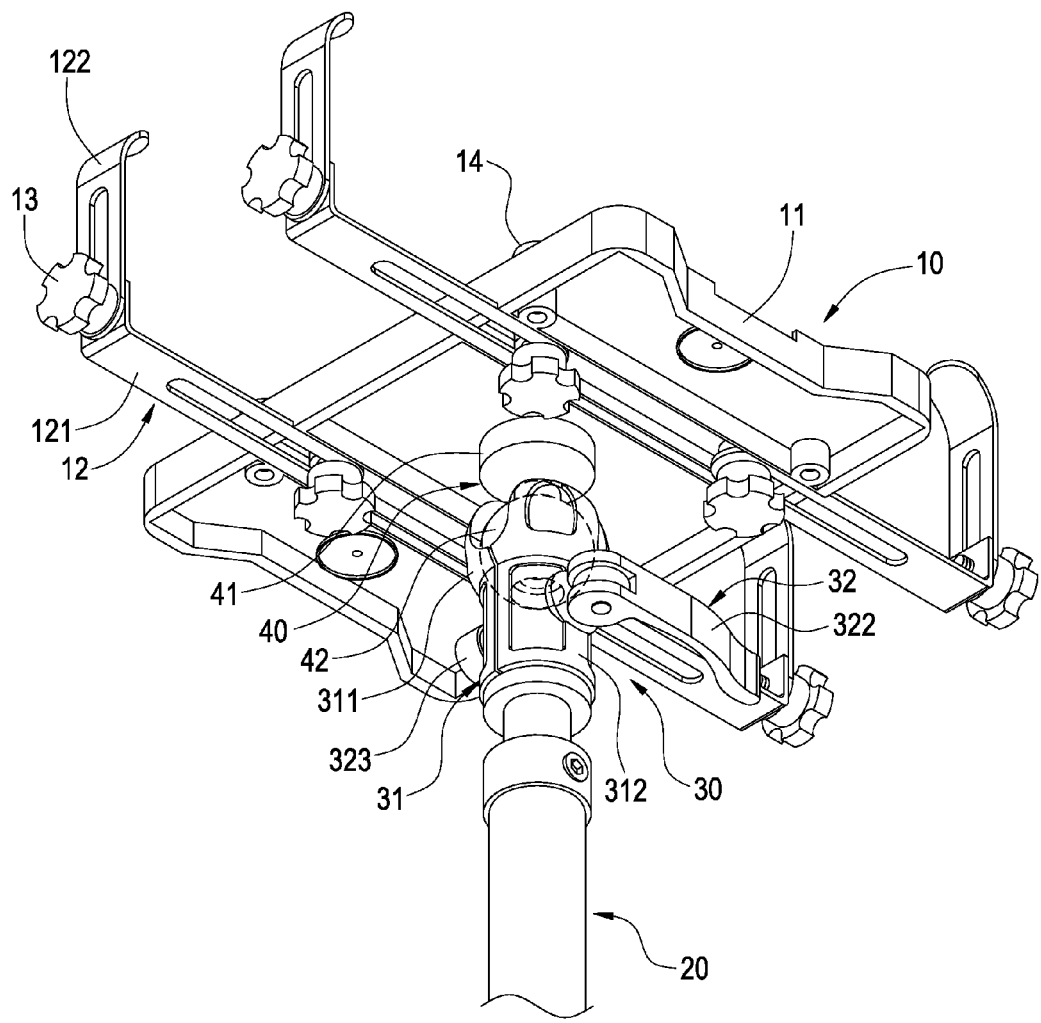
FIG. 4 is a perspective view of the present invention viewed at another viewing angle.
Figure 5:
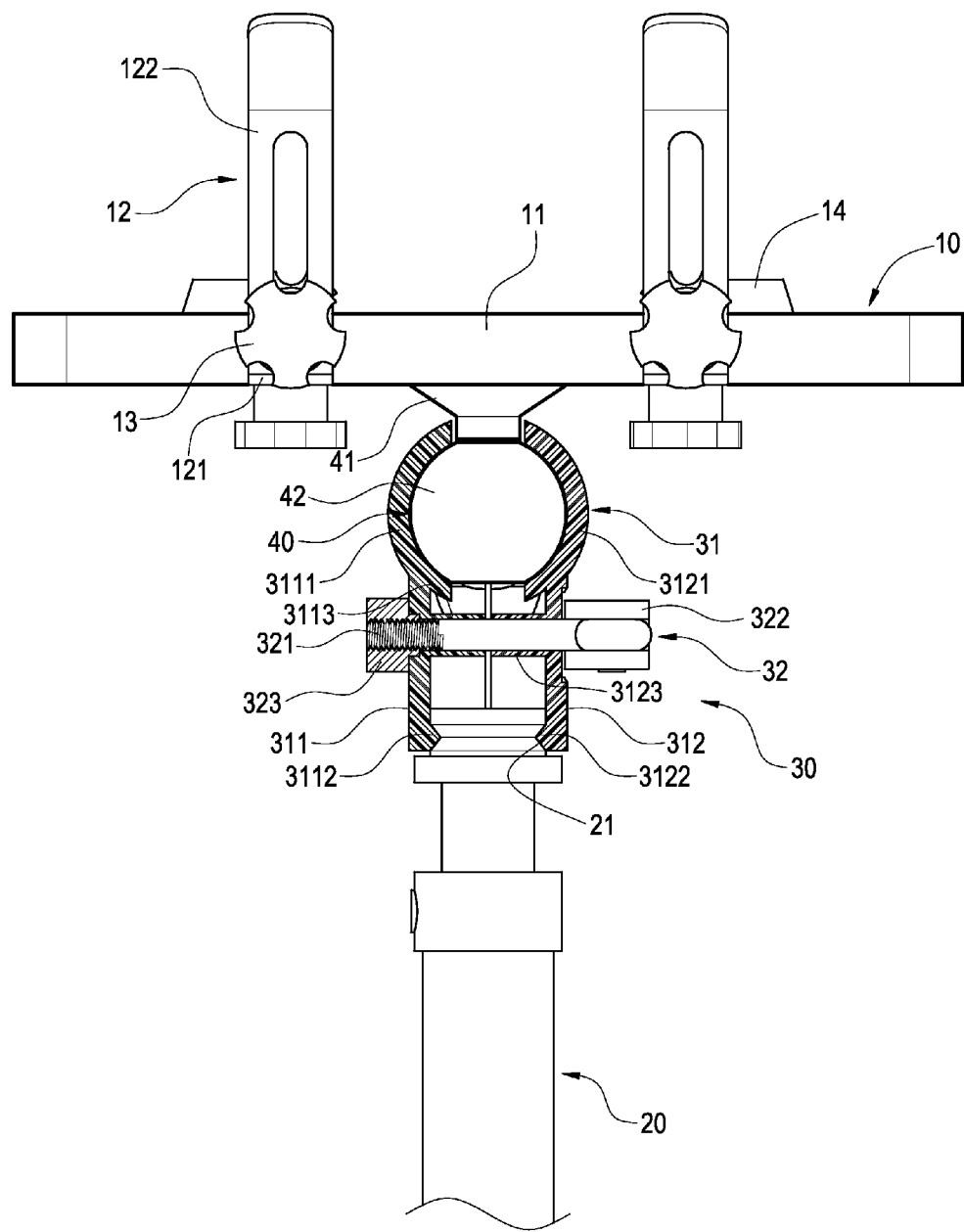
FIG. 5 is a cross-sectional view of Section 5-5 as depicted in FIG. 4.

With reference to FIGS. 3 to 5 for a perspective view of an operation at another viewing angle, a perspective view, and a cross-sectional view of Section 5-5 as depicted in FIG. 4, after the angle of the tray 11 with respect to the support rod 20 is adjusted, the turning rod 322 is turned to abut the surfaces of the binding arc pillar 3221 and the cylindrical pillar 3123 for positioning the tray 11, and the angle of the tray 11 with respect to the support rod 20 can be adjusted to loosen the turning rod 3123, and thus the application is very convenient.

Figure 6:
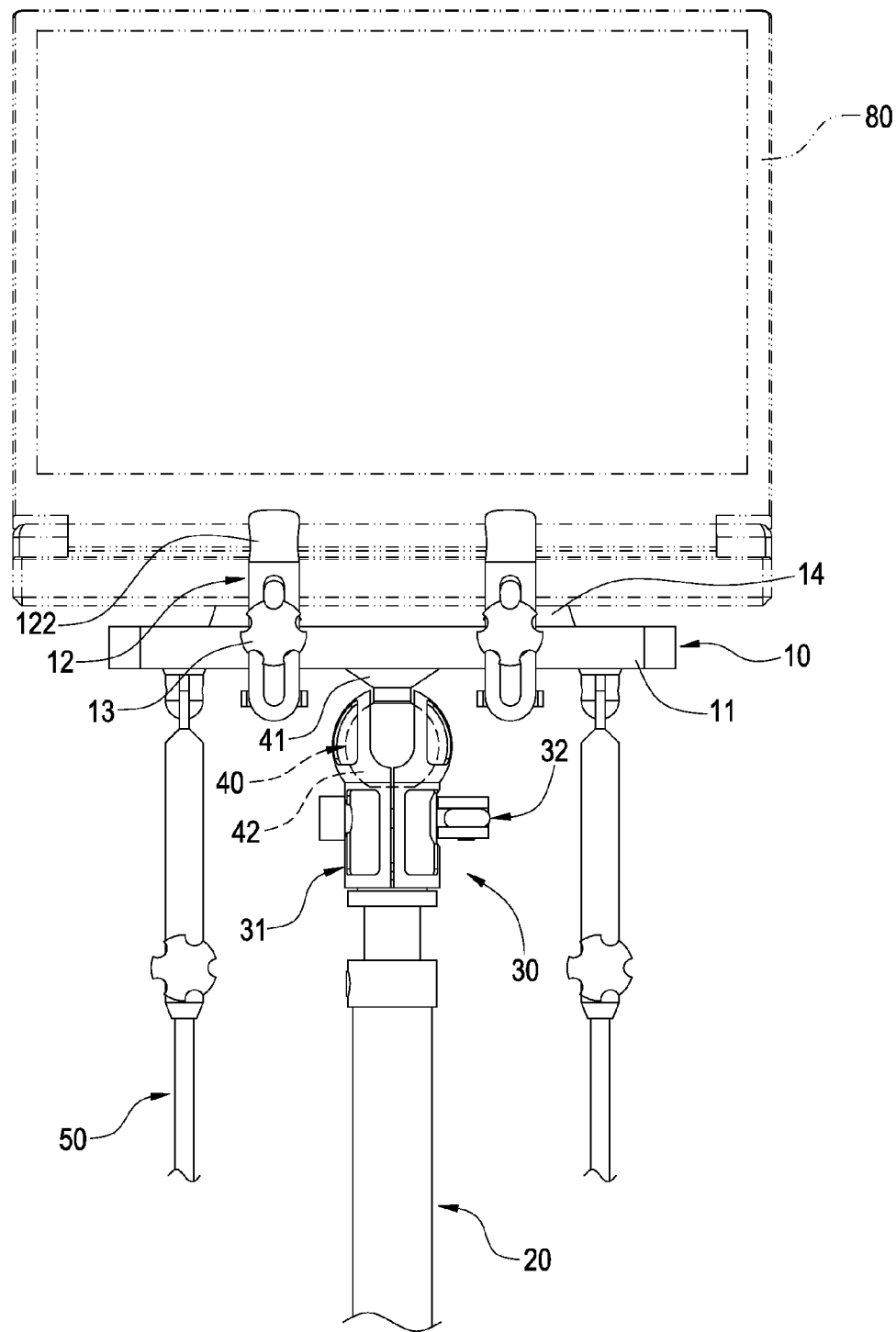
FIG. 6 is a front view of a first preferred embodiment of the present invention.
Figure 7:
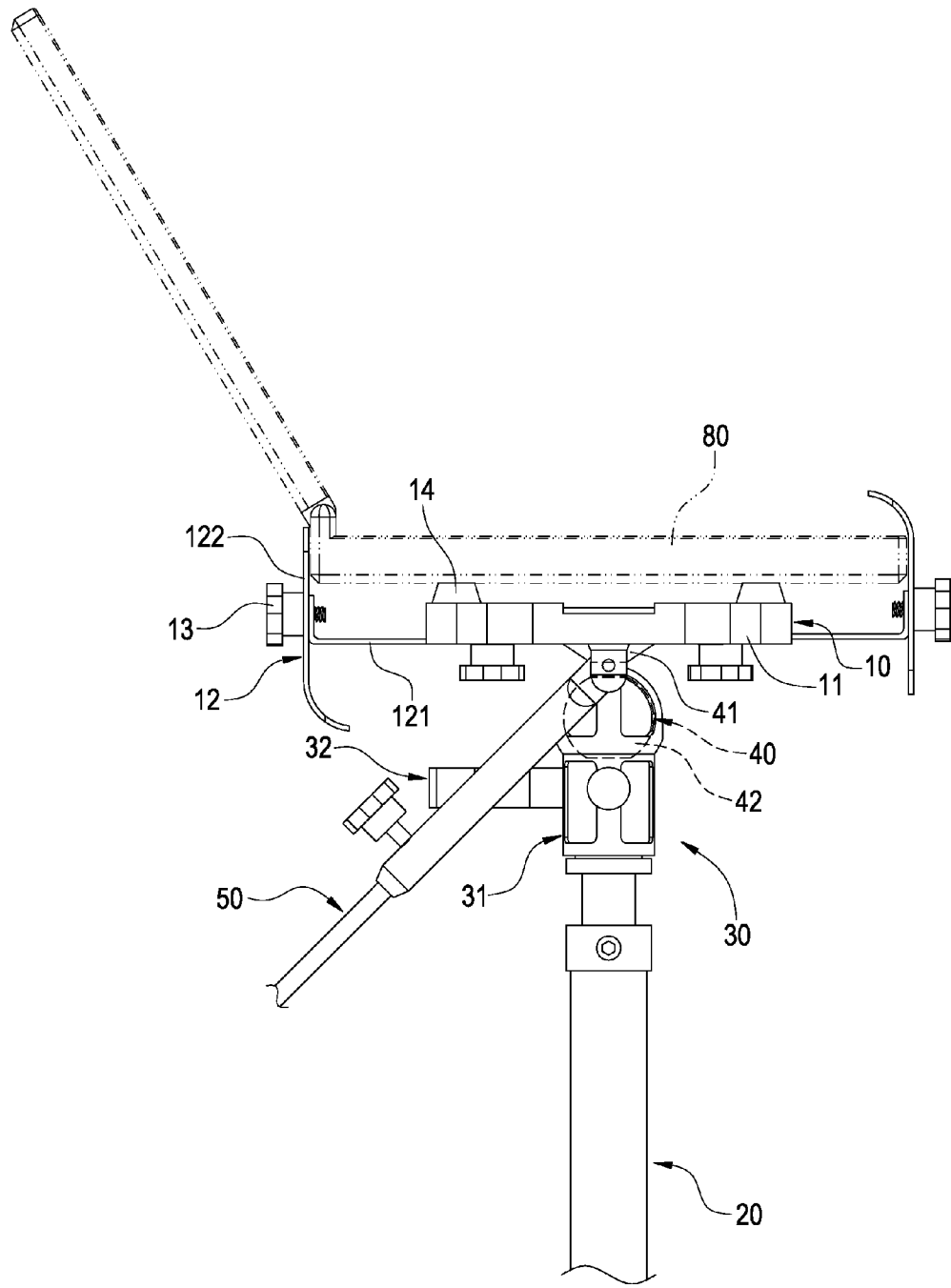
FIG. 7 is a side view of a first preferred embodiment of the present invention.

With reference to FIGS. 6 and 7 for a front view and a side view of a first preferred embodiment of the present invention respectively, an electronic device 80 such as a notebook computer can be placed on the tray 11, and the bottom of the electronic device 80 is abutted against the shock absorber 14, and the binding plate 122 of the positioning frame 12 is provided for securing the electronic device 80 onto the tray 11 to absorb the vibration caused by the traveling of a car and prevent a damage to the electronic device 80 due to vibrations.

Figure 8:
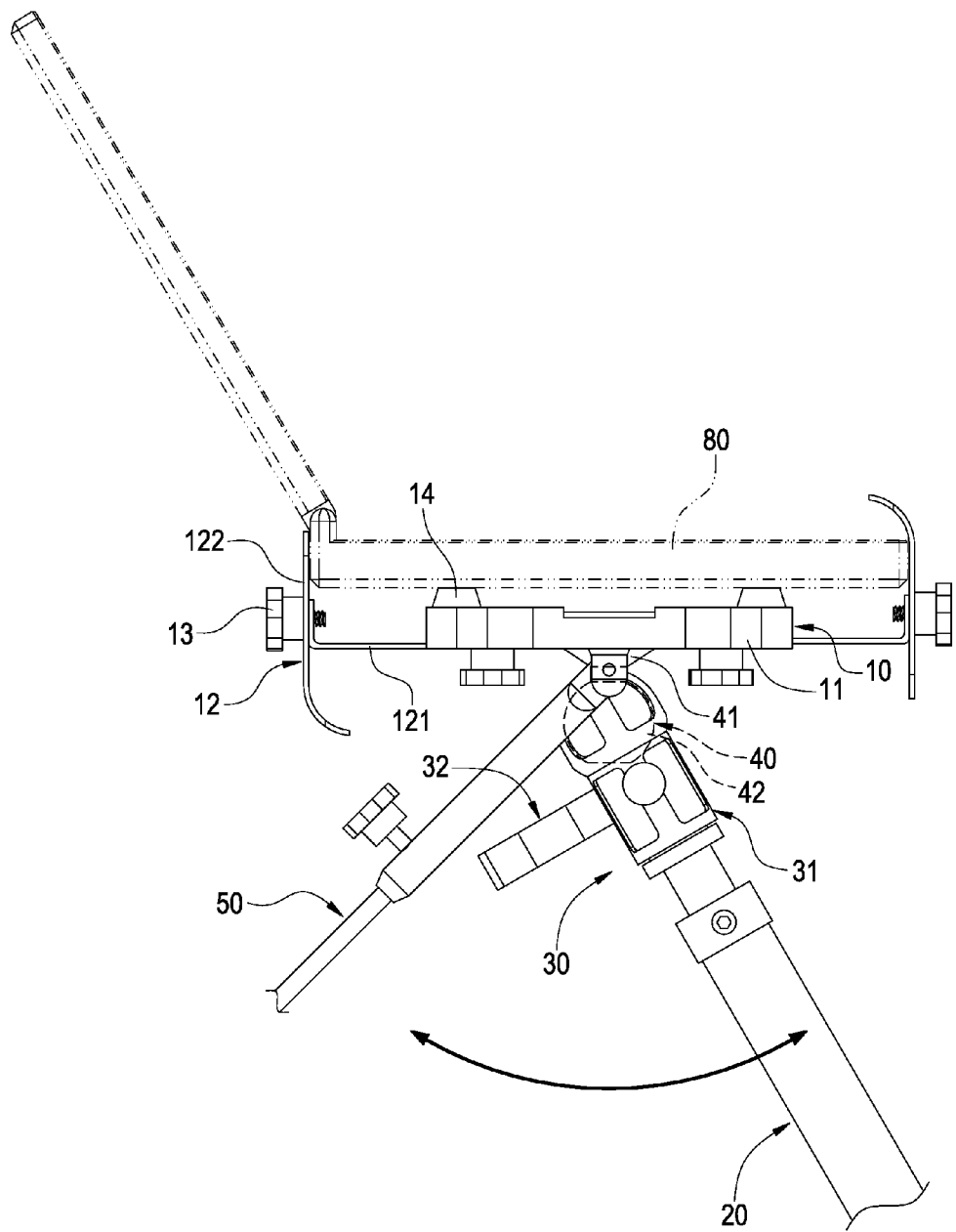
FIG. 8 is a front view of an operation of a second preferred embodiment of the present invention.
Figure 9:
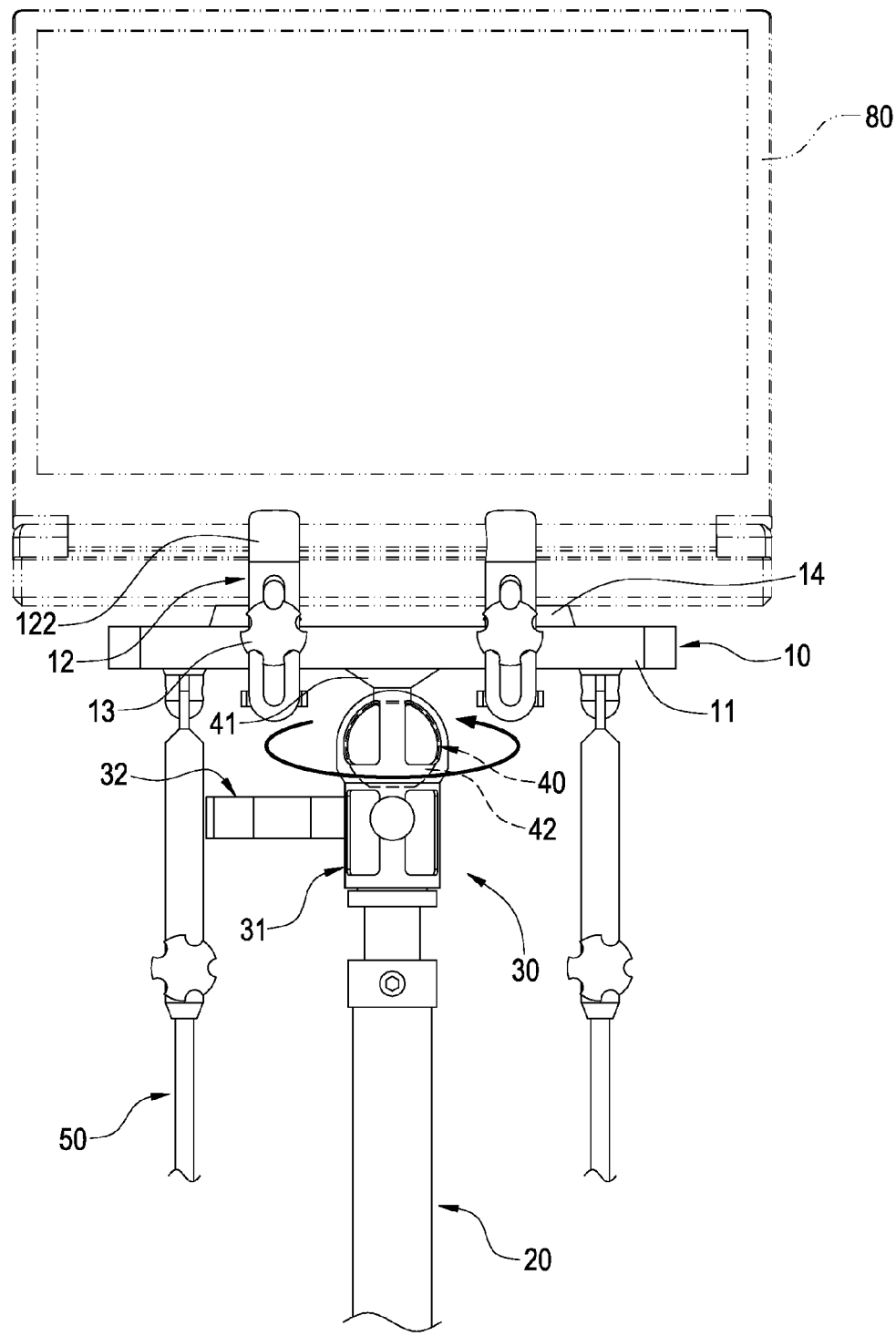
FIG. 9 is a front view of an operation of a second preferred embodiment of the present invention.
Figure 10:
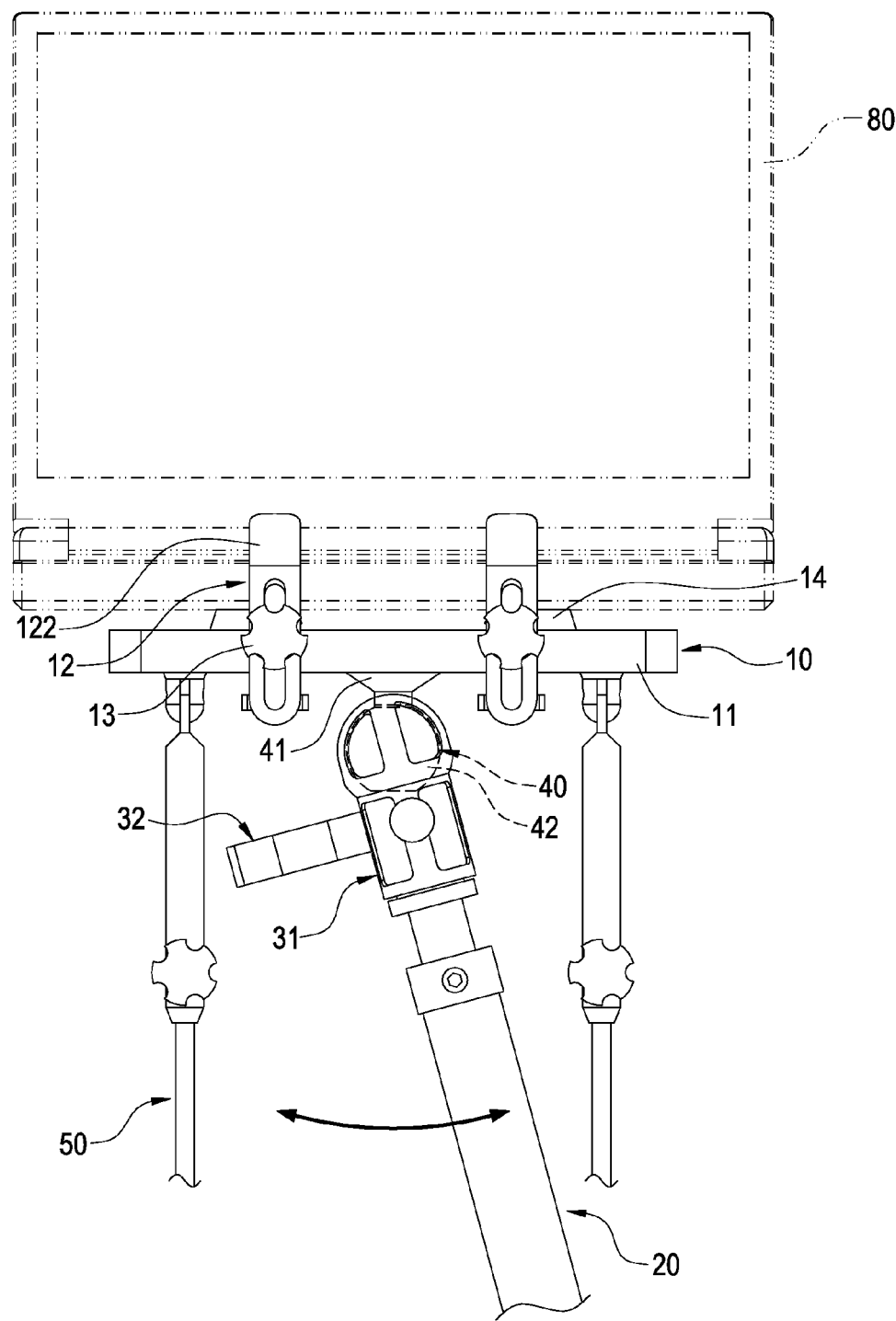
FIG. 10 is another front view of an operation of a second preferred embodiment of the present invention.

With reference to FIGS. 8 to 10 for a side view and front views of a second preferred embodiment of the present invention, the quick release mechanism 30 and the universal joint 40 of the invention use the ball socket 3111, the ball socket 3121 and the spherical ball 42 to achieve free rotation and deviation of the tray 11 with respect to the support rod 20, so that a user can adjust the angle of the tray 11 and position the tray 11 more easily.

Figure 11:
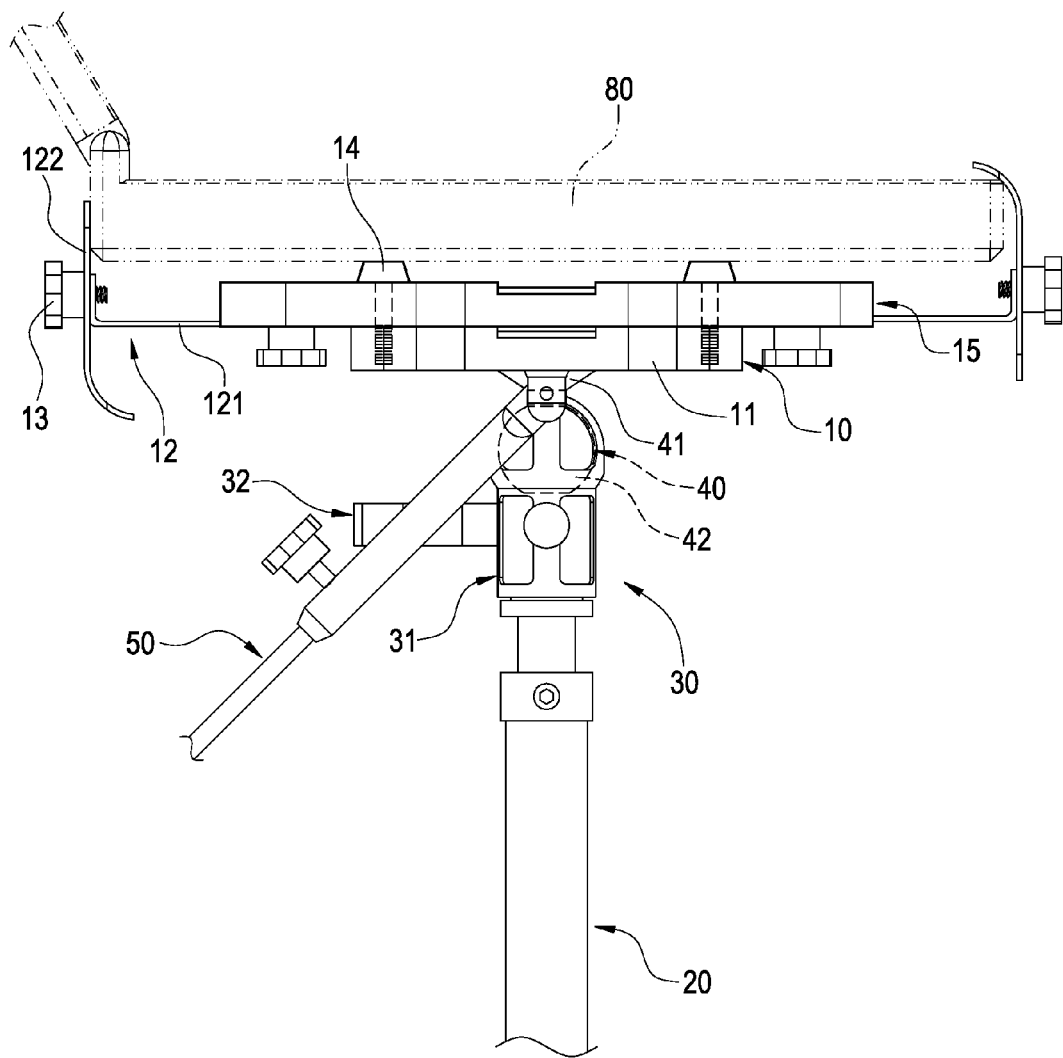
FIG. 11 is a side view of a third preferred embodiment of the present invention.
Figure 12:
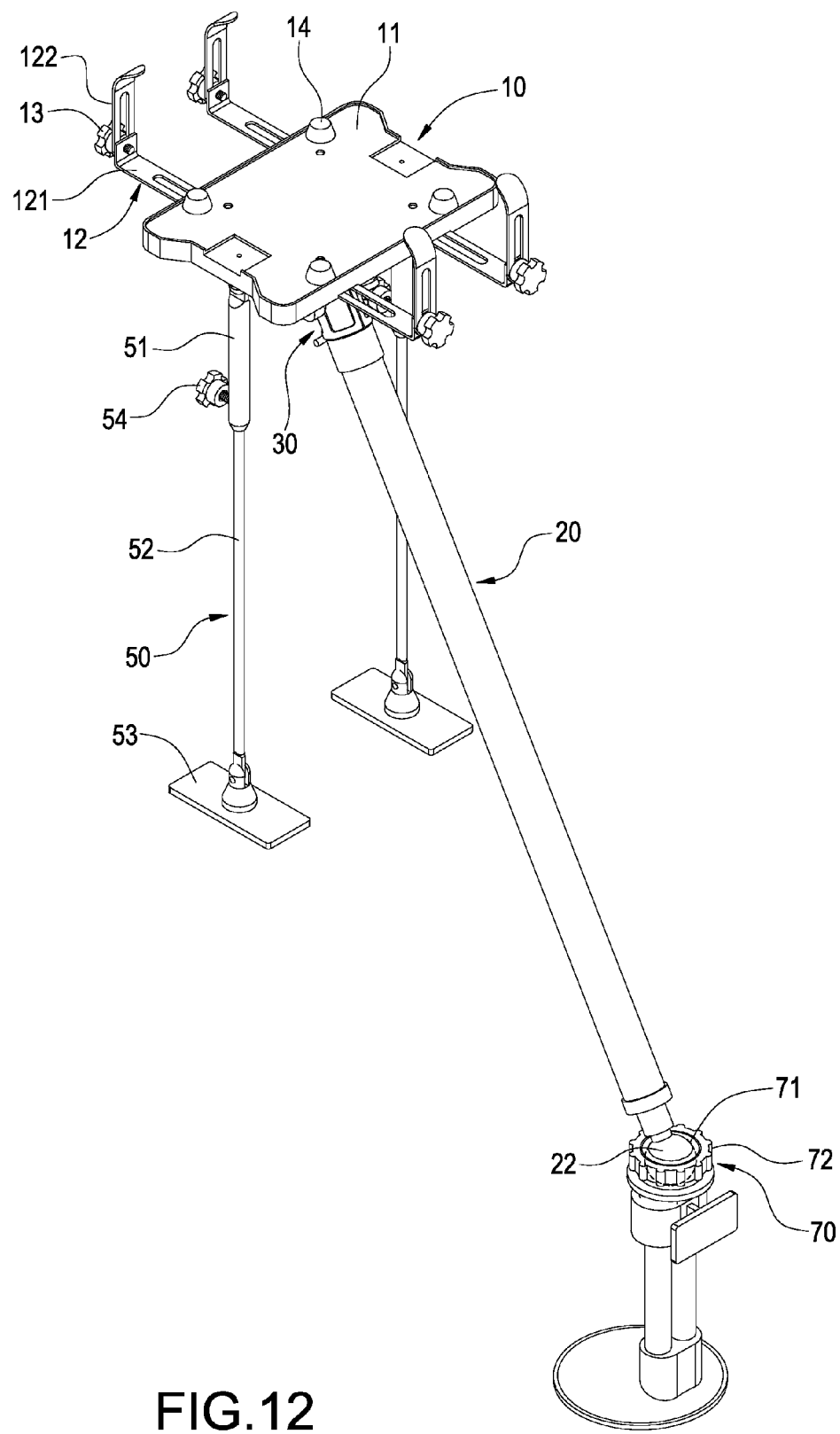
FIG. 12 is a perspective view of a fourth preferred embodiment of the present invention.

With reference to FIG. 11 for a side view of a third preferred embodiment of the present invention, the carrying module 10 further comprises a carrying plate 15 secured onto the top side of the tray 11, and the carrying plate 15 has a size larger than tray 11, and the carrying plate 15 can carry an electronic device 80 with a larger area.

Figure 13:
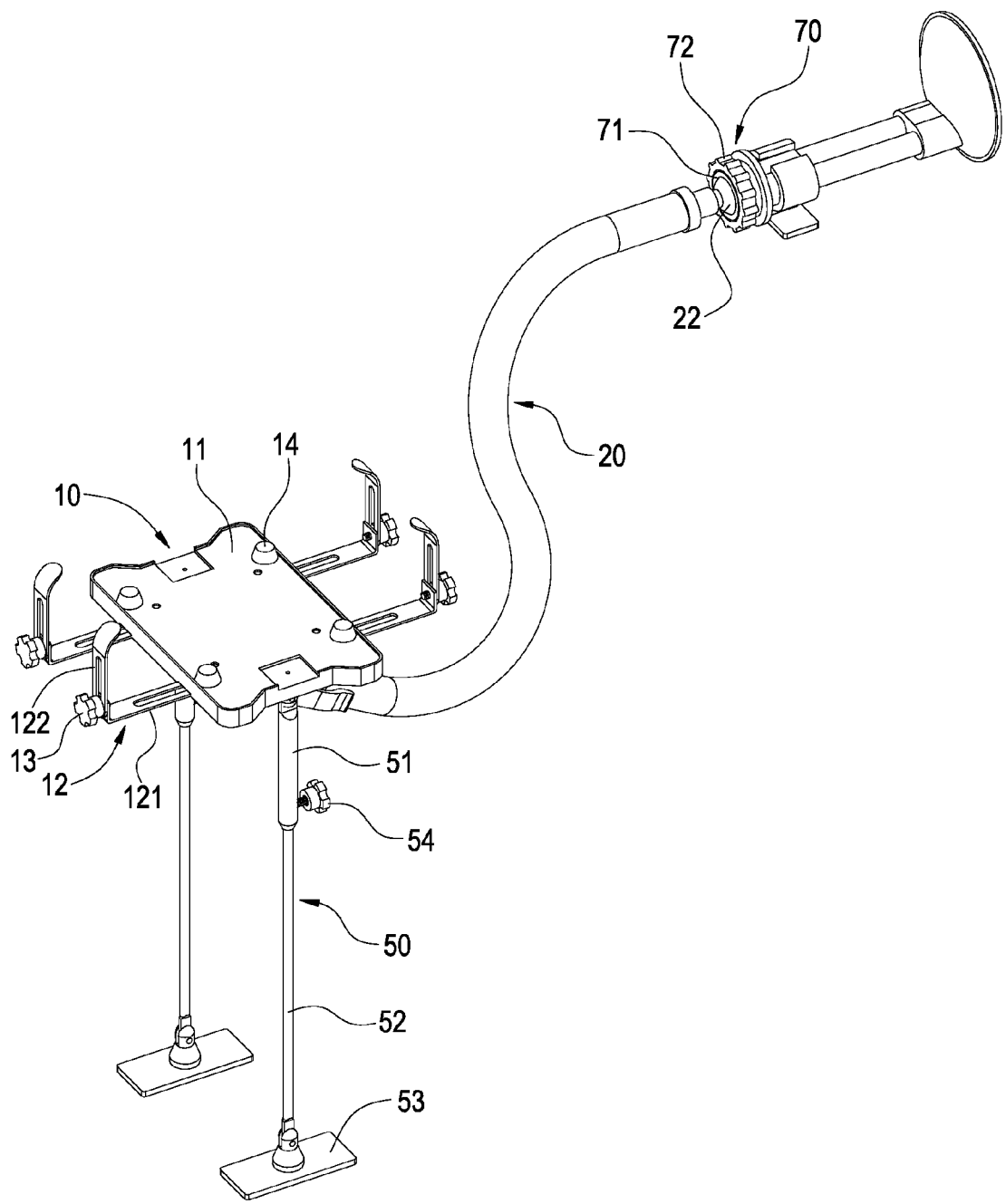
FIG. 13 is a perspective view of a fourth preferred embodiment of the present invention.

With reference to FIG. 13 for a perspective view of a fourth preferred embodiment of the present invention, a universal joint 22 is coupled to an end of the support rod 20, and the carrying apparatus is connected to a car seat or a plane in the car by a positioning means 70 in this preferred embodiment. A containing groove 71 is formed at an end of the positioning means 70 for containing the corresponding universal joint 22, and a binding nut 72 disposed at the external periphery for positioning. Therefore, the universal joint 22 and the containing groove 71 are used for achieving the effect of adjusting the angle freely to improve the practical application of the carrying apparatus.

With reference to FIG. 13 for a perspective view of a fourth preferred embodiment of the present invention, the support rod 20 is a universally bendable support rod that can be bent and positioned freely. In addition, the positioning means 70 can be fixed to another position of a car, such as a windshield, so that the angle of carrying apparatus can be adjusted more freely to provide a more convenient application.

In summation of the description above, the invention complies with patent application requirements, and is duly filed for patent application. While the invention has been described by means of specific embodiments, numerous modifications and variations could be made thereto by those skilled in the art without departing from the scope and spirit of the invention set forth in the claims.

What is claimed is:

1. A carrying apparatus of an automobile portable electronic device, comprising:
    a carrying module, including a tray;
    a support rod, installed under the tray;
    a quick release mechanism, installed between the tray and the support rod, and comprising:
        a clamping module, coupled to the support rod;
        a binder turning rod, passed and disposed at the clamping module;
        a universal joint, with an end coupled to the tray, and another end covered and clamped by the clamping module, such that the tray can be turned and deviated in two-dimensional directions with respect to the support rod; and
    a support module coupled to the bottom side of the tray, and the support module comprising a bushing coupled to the bottom side of the tray and a contractible rod passed into the bushing and contractible with respect to the bushing being pivotally coupled to a plate at the bottom of the contractible rod and a binding screw secured to a lateral side of the bushing.

2. The carrying apparatus of an automobile portable electronic device as recited in claim 1, wherein the clamping module comprises a first clamp and a second clamp coupled to the first clamp, and each of the first and second clamps has a ball socket, and the universal joint includes a connecting end coupled to the tray and a spherical ball coupled to the connecting end, and the spherical ball is covered and held by the ball socket.

3. The carrying apparatus of an automobile portable electronic device as recited in claim 2, wherein the first clamp and the second clamp include a bump formed separately at the bottom of the first clamp and the bottom of the second clamp, and a slot is formed around the periphery of an end of the support rod for embedding the bump.

4. The carrying apparatus of an automobile portable electronic device as recited in claim 3, wherein the first clamp and the second clamp have connected to the bottom of the ball sockets respectively, and the cylindrical pillars are provided for forcibly passing and pressing the binder turning rod.

5. The carrying apparatus of an automobile portable electronic device as recited in claim 4, wherein the binder turning rod comprises a screw pillar pivotally coupled to a turning rod at an end of the screw pillar and a nut, and the screw pillar is passed through the cylindrical pillars, and the nut is secured at another end of the screw pillar.

6. The carrying apparatus of an automobile portable electronic device as recited in claim 5, wherein the turning rod includes a binding arc pillar abutted against an outer surface of the cylindrical pillar for forcibly pressing the first clamp and the second clamp.

7. The carrying apparatus of an automobile portable electronic device as recited in claim 1, wherein the carrying module further comprises a carrying plate fixed onto the tray, and the carrying plate has a size larger than the tray.

8. The carrying apparatus of an automobile portable electronic device as recited in claim 1, wherein the carrying module further comprises a plurality of positioning frames coupled to the tray and a plurality of binding screws for fixing the positioning frames and connecting the tray.

9. The carrying apparatus of an automobile portable electronic device as recited in claim 8, wherein the positioning frame comprises a support plate and a binding plate coupled to both ends of the support plate respectively, and the support and binding plates are substantially in a U-shape, and the binding plate is fixed to the support plate by a binding screw.

10. The carrying apparatus of an automobile portable electronic device as recited in claim 1, wherein the carrying module comprises a plurality of shock absorbers coupled to the tray.

* * * * *